United States Patent
Kuykendall et al.

(10) Patent No.: US 10,457,824 B2
(45) Date of Patent: *Oct. 29, 2019

(54) METHOD OF INKJET PRINTING

(71) Applicant: Eastman Kodak Company, Rochester, NY (US)

(72) Inventors: Valerie Lynn Kuykendall, Penfield, NY (US); Peter John Ghyzel, Rochester, NY (US); Catherine A. Falkner, Rochester, NY (US); John Leonard Muehlbauer, Stafford, NY (US); Thomas B. Brust, Webster, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/729,882

(22) Filed: Oct. 11, 2017

(65) Prior Publication Data
US 2019/0106587 A1 Apr. 11, 2019

(51) Int. Cl.
| | |
|---|---|
| B41J 2/21 | (2006.01) |
| B41M 5/00 | (2006.01) |
| C08G 18/08 | (2006.01) |
| C08G 18/10 | (2006.01) |
| C08G 18/24 | (2006.01) |
| C08G 18/32 | (2006.01) |
| C08G 18/34 | (2006.01) |
| C08G 18/48 | (2006.01) |
| C08G 18/65 | (2006.01) |
| C08G 18/66 | (2006.01) |
| C08G 18/69 | (2006.01) |
| C08G 18/72 | (2006.01) |
| C08G 18/75 | (2006.01) |
| C08G 18/76 | (2006.01) |
| C09D 11/322 | (2014.01) |
| C09D 11/326 | (2014.01) |
| C09D 11/40 | (2014.01) |
| C09D 11/102 | (2014.01) |
| C09D 11/38 | (2014.01) |
| C09D 11/106 | (2014.01) |

(52) U.S. Cl.
CPC ........ *C09D 11/322* (2013.01); *C08G 18/0823* (2013.01); *C08G 18/246* (2013.01); *C08G 18/3206* (2013.01); *C08G 18/3212* (2013.01); *C08G 18/3215* (2013.01); *C08G 18/348* (2013.01); *C08G 18/4854* (2013.01); *C08G 18/6588* (2013.01); *C08G 18/6692* (2013.01); *C08G 18/69* (2013.01); *C08G 18/724* (2013.01); *C08G 18/755* (2013.01); *C08G 18/7671* (2013.01); *C09D 11/102* (2013.01); *C09D 11/326* (2013.01); *C09D 11/38* (2013.01); *C09D 11/40* (2013.01); *B41J 2/21* (2013.01); *B41M 5/0041* (2013.01); *C08G 18/10* (2013.01); *C09D 11/106* (2013.01)

(58) Field of Classification Search
CPC ........ B41J 2/21; C08G 18/10; C08G 18/4854; C08G 18/6588; C08G 18/6692; C08G 18/69; C08G 18/724; C08G 18/755; C08G 18/7671; C08G 18/0823; C08G 18/246; C08G 18/3206; C08G 18/3212; C08G 18/3215; C08G 18/348; C09D 11/322; C09D 11/326; C09D 11/40; C09D 11/106; C09D 11/102; C09D 11/38; B41M 5/0041
See application file for complete search history.

(56) References Cited

U.S. PATENT DOCUMENTS

| | | | |
|---|---|---|---|
| 5,608,000 A * | 3/1997 | Duan | C08G 18/0819 428/423.1 |
| 7,074,850 B2 | 7/2006 | Hees et al. | |
| 8,186,822 B2 | 5/2012 | Li et al. | |
| 8,931,889 B2 | 1/2015 | Roberts et al. | |
| 9,145,502 B2 | 9/2015 | Brust et al. | |
| 9,605,169 B1 | 3/2017 | Lussier et al. | |
| 2008/0207811 A1 | 8/2008 | Brust et al. | |
| 2009/0169749 A1 | 7/2009 | Brust et al. | |
| 2009/0259012 A1 | 10/2009 | Roberts | |
| 2010/0055322 A1 | 3/2010 | Brust et al. | |
| 2011/0091696 A1* | 4/2011 | Tanaka | B41M 5/0023 428/195.1 |
| 2012/0050380 A1 | 3/2012 | Falkner et al. | |
| 2013/0165584 A1* | 6/2013 | Ishibashi | C08G 18/4833 524/590 |
| 2013/0245157 A1 | 9/2013 | Kuriyama et al. | |

FOREIGN PATENT DOCUMENTS

| | | |
|---|---|---|
| WO | 2009/076381 A1 | 6/2009 |
| WO | 2012/031064 A1 | 3/2012 |

* cited by examiner

*Primary Examiner* — Patrick D Niland
(74) *Attorney, Agent, or Firm* — J. Lanny Tucker

(57) ABSTRACT

An inkjet printing method uses an aqueous inkjet ink composition having a non-crosslinked, crosslinkable polyurethane having an acid number of 20-40 and is derived from an aromatic diisocyanate; and a diol mixture of $D_1$ and $D_2$ diols, and optionally including $D_3$ diol, $D_4$ diol, or both $D_3$ and $D_4$ diols. $D_1$ has a $C_3$ to $C_7$ aliphatic group and a pendant carboxy group or neutralized carboxy group. $D_2$ has a chain of repeating $C_2$ to $C_6$ alkylene oxide groups. $D_3$ is an alkoxylated bisphenol A or aliphatic cyclic diol, present at least 5 mol %. $D_4$ is a hydroxy-terminated polybutadiene having a molecular weight of at least 1000 and is present in an amount of 0.1-5 mol %. The ink composition also contains a dispersed pigment colorant; a humectant or organic co-solvent, and optionally, a crosslinking agent.

18 Claims, No Drawings

METHOD OF INKJET PRINTING

CROSS-REFERENCE TO RELATED APPLICATIONS

Reference is made to the following copending and commonly assigned patent applications:
U.S. Ser. No. 15/729,714 filed on Oct. 11, 2017; and
U.S. Ser. No. 15/729,736 filed on Oct. 11, 2017.

FIELD OF THE INVENTION

This invention relates to a method for inkjet printing to form colored images with improved wash and color fastness on textiles or other fabrics. The aqueous inkjet compositions useful therein contain a non-crosslinked, crosslinkable polyurethane and a dispersed pigment colorant.

BACKGROUND OF THE INVENTION

Inkjet printing is a non-impact method for producing printed images by the deposition of ink drops in a pixel-by-pixel manner onto a suitable substrate in response to digital signals. There are various printing methods and apparatus known in the art to control the deposition of ink drops including what are considered "drop-on-demand" (DOD) printing systems and "continuous ink jet" (CIJ) printing systems. For DOD printing systems, individual ink drops are projected as needed onto a substrate using various means for droplet deposition control. DOD printing systems are widely used in home or consumer inkjet printers that have been available for several decades.

Colored pigment-based inks have been proposed as a means for addressing limitations of dye-based inks. In pigment-based inks, the colorant exists as discrete particles, and such particles can be present as self-dispersed or encapsulated materials, or they can be dispersed and stabilized using polymers or various surfactants. A wide variety of pigments can be chosen for use in this manner depending upon the specific application and performance characteristics of the printing system and desired printing results.

More recently, there has been a greater need for aqueous inkjet ink compositions that can be used to print images onto textiles such as clothing, draperies, carpeting, household linens, leather, and any porous or non-porous material made from natural or synthetic fibers. However, such applications of inkjet printing technology require additional features than may be necessary for other substrates, including for example improved color fastness and wash (laundry) fastness. Inkjet printed fabrics are particularly susceptible to color image removal by repeated laundering and other abrasion actions including the usual wearing (for clothing and bed linens) or foot traffic (for carpeting) and have limited durability. For example, printed colors may fade upon repeated washing and pigmented colorants may transfer to washing machine parts or be washed into the environment or sewage treatment facilities.

Polyurethanes have been known for several years as useful additives to particle-based inkjet ink compositions. For example, polyurethanes are described for use in green colored particle-based inkjet ink compositions for use in both DOD and CIJ printing operations in U.S. Pat. No. 9,605,169 (Lussier et al.), and as part of core-shell particles dispersed within inkjet ink compositions described in U.S. Pat. No. 9,145,502 (Brust et al.).

U.S. Pat. No. 7,074,850 (Hees et al.) describes crosslinkable polyurethane block copolymers for colorant preparations for use in inkjet printing.

U.S. Pat. No. 8,186,822 (Li et al.) describes the use of crosslinked polyurethane dispersoid binder additives in inkjet inks for printing textiles. Such materials are prepared from a unique set of diols to allegedly provide improved durability and color fastness of inkjet printed color images on textiles.

While there have been advances in the field of inkjet printing of particle-based (pigment-based) inkjet ink compositions, including their use to provide color images on textile, there is a continuing need to improve the light fastness and color fastness of such color images especially after multiple laundering and continual abrasive uses. The present invention is directed to providing such an improvement.

SUMMARY OF THE INVENTION

The present invention provides a method for inkjet printing, comprising:
  inkjet printing an aqueous inkjet ink composition onto a substrate to provide an inkjet printed image, wherein the aqueous inkjet ink composition has a viscosity of at least 1 centipoise and up to and including 100 centipoise at 25° C., and comprises:
  (a) an aqueous solvent medium,
  (b) a non-crosslinked, crosslinkable polyurethane having an acid number of at least 20 and up to and including 40, and a glass transition temperature ($T_g$) of up to and including 40° C.,
  the non-crosslinked crosslinkable polyurethane derived from:
  1) an aromatic diisocyanate; and
  2) a diol mixture of at least $D_1$ and $D_2$ diols, and optionally including a $D_3$ diol, a $D_4$ diol, or both the $D_3$ and $D_4$ diols,
    wherein:
    the $D_1$ diol comprises a $C_3$ to $C_7$ aliphatic group between two hydroxy groups, and at least one pendant carboxy group or pendant neutralized carboxy group,
    the $D_2$ diol comprises a chain of one or more repeating $C_2$ to $C_6$ alkylene oxide groups and has a molecular weight of at least 250 and up to and including 3,000,
    the $D_3$ diol is an alkoxylated bisphenol A or an aliphatic cyclic diol that is present in an amount of at least 5 mol %, based on the total molar amount of the $D_1$ through $D_4$ diols in the diol mixture, and
    the $D_4$ diol is a hydroxy-terminated polybutadiene having a molecular weight of at least 1000, and is present in an amount of at least 0.1 mol % and up to and including 5 mol %, based on the total molar amount of the $D_1$ through $D_4$ diols in the diol mixture;
  (c) a dispersed pigment colorant;
  (d) a humectant or organic co-solvent, and
  (e) optionally, a crosslinking agent.

Improved aqueous inkjet ink compositions have been developed that comprising specific water-soluble or water-dispersible, crosslinkable polyurethanes that can be crosslinked after application to substrates such as textile substrates. Such aqueous inkjet ink compositions, containing such crosslinkable polyurethanes, have been found to exhibit improved water fastness and color fastness after multiple washings, compared to known compositions containing crosslinked polyurethanes. It is particularly noteworthy that the noted crosslinkable polyurethanes can be combined with dispersed pigment colorants that are stabilized with non-polymeric anionic surfactants. In some embodiments, unique crosslinkable polyurethanes have been designed from a mixture of four types of diols that exhibit a unique combination of properties such as flexibility, softness, and water dispersibility along with the inherent ability to be crosslinked, ensuring improved wash durability, colorfastness, and resistance to mechanical abrasion in the inkjet printed color images on textiles while maintaining desirable tactile properties.

The following disclosure provides exemplary details of useful crosslinkable polyurethanes and other components and properties of aqueous inkjet ink compositions and their use to provide wash fast and color fast images on textile substrates.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described from the discussion of any embodiment.

Definitions

As used herein to define various reactants used to prepare the crosslinkable polyurethanes and the various components of the aqueous inkjet ink compositions and other materials used in the practice of this invention, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term should be interpreted to have a standard dictionary meaning.

The use of numerical values in the various ranges specified herein, unless otherwise expressly indicated otherwise, are approximations as though the minimum and maximum values within the stated ranges were both preceded by the word "about." In this manner, slight variations above and below the stated ranges may be useful to achieve substantially the same results as the values within the ranges. In addition, the disclosure of these ranges is intended as a continuous range including every value between the minimum and maximum values as well as the end points of the ranges.

As used herein, "acid number" (also known as acid value) is defined as the milligrams (mg) of potassium hydroxide required to neutralize 1 g of the described acidic polymer.

Glass transition temperature ($T_g$) is a material parameter that is measurable using Differential Scanning calorimetry and known procedures.

The term "aqueous" in aqueous organic pigment dispersions and aqueous inkjet ink compositions as used in the present invention means that the water content is greater than 50 weight %, or even greater than 70 weight %, based on the total dispersion or solvent medium weight. Thus, water is the predominant solvent in the solvent medium in which all materials are dispersed or dissolved.

The polyurethanes according to the present invention are "non-crosslinked" meaning that they contain no insoluble fraction. It is stated in *Principles of Polymerization, $2^{nd}$ Edition*, Odian, McGraw-Hill, 1981: "Crosslinking is distinguished by the occurrence of gelation at some point in the polymerization. At this point, termed the gel point, one first observes the visible formation of a gel or insoluble polymer fraction. The gel is insoluble in all solvents at elevated temperatures under conditions where polymer degradation does not occur. The gel corresponds to the formation of an infinite network in which polymer molecules have been crosslinked to each other to form a macroscopic molecule. The gel is in fact considered as one molecule. The non-gel portion polymer remains soluble in solvents."

The polyurethanes according to the present invention are considered "crosslinkable" meaning that they will form covalent bonds between polymer molecules either thermally or with the addition of a crosslinking agent, with or without the application of heat by virtue of the aromatic and unsaturated groups within the recurring units within the polymers.

Particle size for the various dispersed colorants refers to the approximate diameter of a generally spherical pigment particle or to the approximate largest characteristic dimension of a non-spherical particle. The desired median primary particle diameter (or $50^{th}$ percentile, d50, or 50%, Intensity mode particle size) of each of the organic pigments in the aqueous organic pigment dispersions and aqueous inkjet ink compositions according to the present invention is less than 200 nm and at least 95% of the colored particles have a particle diameter of less than 500 nm. This refers to the $95^{th}$ percentile (d95 or 95%) Intensity mode particle size that is the classified particle size distribution such that 95% of the volume of organic pigment particles is provided by particles having diameters smaller than the indicated diameter. Similarly, the $50^{th}$ percentile Intensity mode particle size refers to the classified particle size distribution such that 50% of the volume of organic pigment particles is provided by particles having diameters smaller than the indicated diameter. Particle size (or particle volume) can be readily measured using a conventional laser light scattering instrument.

The organic pigments (such as pigment colorants) used in the various embodiments of the present invention are generally not self-dispersing meaning that the organic pigment particles are not purposely surface treated to provide dispersibility in aqueous formulations, but some surface treatment can be present as provided during commercial manufacturer of the organic pigments. Thus, such organic pigments can include one or more organic pigment dispersants or stabilizing surfactants or polymers as described below generally to keep them suspended in an aqueous medium. But, some organic pigments are "self-dispersing" and do not require a separate dispersant or stabilizing material.

The terms "water-soluble" and "aqueous-soluble" mean that at least 2% by mass of a material can be dissolved in distilled water at 25° C., or particularly at least 5% by mass of such material can be so dissolved to provide a homogeneous and visibly clear solution.

For clarification of definitions for any terms relating to polymers, reference should be made to "Glossary of Basic Terms in Polymer Science" as published by the International Union of Pure and Applied Chemistry ("IUPAC"), *Pure Appl. Chem.* 68, 2287-2311 (1996). However, any definitions explicitly set forth herein should be regarded as controlling. Polymers can be prepared from ethylenically unsaturated polymerizable monomers using free radical polymerization or acid catalyzed polymerization processes, or by reaction of appropriate condensation monomers (for example diols and diisocyanates as described below) using known condensation polymerization processes.

Unless otherwise indicated, the terms "polymer" and "polymeric" refer to homopolymers and copolymers, each having a weight average molecular weight ($M_w$) of at least 5,000 as measured using gel permeation chromatography (GPC, polystyrene standard) or size exclusion chromatography (SEC). As described below, specific types of polymers can have a specified weight average molecular weight.

The term "backbone" refers to the chain of atoms in a polymer to which a plurality of pendant groups can be attached. An example of such a backbone is an "all carbon" backbone obtained from the polymerization of one or more ethylenically unsaturated polymerizable monomers. However, other backbones can include heteroatoms wherein the polymer is formed by a condensation reaction of a diisocyanate and one or more diols.

Uses

The materials and compositions described herein according to the present invention are designed for use in inkjet printing to form colored images on various substrates, but particularly on textiles (as described below). Details for inkjet printing are provided below and the present invention is not limited to a specific inkjet printing system.

However, it is to be understood that novel non-crosslinked, crosslinkable polyurethanes described herein can have uses beyond that of aqueous inkjet ink compositions. A skilled worker in various technologies would readily recognize such uses after consideration of the properties described for these polymers. For example, it is possible to crosslink such non-crosslinked, crosslinkable polyurethanes using thermal means, with or without crosslinking agents (described below), and such crosslinked polymeric materials can also have additional or different uses that would be readily apparent to one skilled in the art.

Polyurethanes

The advantages described herein are achieved in general by using one or more water-soluble or water-dispersible non-crosslinked, crosslinkable polyurethanes. Such materials are designed to have an acid number of at least 20 and up to and including 40, or of at least 25 and up to and including 35. A skilled worker would be able, using the teaching provided herein, to design a non-crosslinked, crosslinkable polyurethane according to the present invention that is optimal for a specific use.

Moreover, the useful non-crosslinked, crosslinkable polyurethanes can have a $T_g$ up to and including 40° C. In some embodiments, the $T_g$ of each of these materials is at least 10° C. and up to and including 40° C. but generally, the lower the $T_g$ the better performance in the aqueous inkjet ink compositions and methods according to the present invention.

In general, the useful non-crosslinked, crosslinkable polyurethanes according to this invention have a weight average molecular weight ($M_w$) of at least 20,000 and up to and including 150,000, or more likely of at least 35,000 and up to and including 120,000. Polymers having higher molecule weights can lead to inkjet ink compositions with viscosities that are too high to be useful.

Useful polyurethanes according to the present invention can be prepared by reaction of one or more aromatic diisocyanates with a mixture of multiple classes of diols including a first diol, $D_1$, and a second diol, $D_2$, and optionally one or both of third and fourth diols, $D_3$ and $D_4$, respectively. Each class of diol can comprise a mixture of diols within the class definition.

Useful aromatic diisocyanates include compounds having a substituted or unsubstituted aromatic moiety such as a phenylene or naphthalene moiety and at least two isocyanate [—N(C═O)—] reactive groups. Such compounds can also comprise aliphatic moieties connected to the aromatic moiety. Representative compounds of this type include but are not limited to, 4,4-methylenebis(phenyl isocyanate), m-tetramethyl xylylene diisocyanate, p-tetramethyl xylylene diisocyanate, 1,4-xylylene diisocyanate, 1,3-xylylene diisocyanate, methane-bis-(4-phenylene isocyanate), toluene diisocyanate, their isomers, naphthalene diisocyanate, toluene diisocyanate dimer, phenylene diisocyanate dimer, their derivatives, and mixtures thereof.

As observed in Inks Y6, C6, and M6 described below, when a diisocyanate having a substituted or unsubstituted aromatic moiety was replaced in the polyurethane reaction mixture with a "non-aromatic" diisocyanate (having no aromatic moiety) such as isophorone diisocyanate, the color fastness of the resulting inkjet image prints containing such polyurethanes was very poor.

The aromatic diisocyanates described above are reacted with a mixture of diols comprising at least two different diols, and in some embodiments, three different diols, or even four different diols. Thus, not just any combination of diols that is reactive with an isocyanate group is useful in the present invention. The diol mixture used to prepare the useful non-crosslinked, crosslinkable polyurethanes according to the present invention include at least one $D_1$ diol, at least one $D_2$ diol, and in many embodiments, also at least one $D_3$ diol or at least one $D_4$ diol, or at least one $D_3$ diol and at least one $D_4$ diol.

Each useful $D_1$ diol comprises a $C_3$ to $C_7$ an acyclic aliphatic group (linear or branched) between the two hydroxy groups. In other words, this aliphatic group comprises 3 to 7 carbon atoms, or it can comprise 3 to 5 carbon atoms ($C_3$ to $C_5$), and can be substituted with one or more substituents that do not interfere with the reaction of the $D_1$ diol with the diisocyanate or adversely affect the properties of the resulting non-crosslinked, crosslinkable polyurethane. It is essential that the $D_1$ diol comprise one or more pendant carboxy groups or pendant carboxy groups that have been neutralized with a suitable base, as described below. In most instance, a single carboxy group (or neutralized carboxy group) is sufficient to contribute the desired polyurethane acid number. For example, useful $D_1$ diols can be represented by the following Structure ($D_1$):

$$\text{HO}-\text{R}(-\text{R'})-\text{OH} \qquad (D_1)$$

wherein R represents the acyclic aliphatic (linear or branched) group having 3 to 7 carbon atoms (or 3 to 5 carbon atoms) and R' represents one or more carboxy groups (or neutralized carboxy groups) attached to one or more of the carbon atoms in R. In most embodiments, one R' group is present and is attached to a carbon atom that is at least one carbon atom removed from each —OH group.

Useful $D_1$ diols (and at least partially neutralized counterparts) include but are not limited to, 2,2'-bis(hydroxymethyl) propionic acid, 2,2'-bis(hydroxymethyl) butanoic acid, and the hydroxyether of 2,4'-bis(1-hydroxyphenyl) valeric acid. Suitable neutralizing agents for the $D_1$ diols include but are not limited to, ammonia, amines, or alkali metal hydroxides. Particularly useful neutralizing agents include ammonium hydroxide, dimethylaminoethanol, and potassium hydroxide. Neutralization can take place at any point in the manufacturing process.

Mixtures of different $D_1$ diols can be used if desired. Useful $D_1$ diols can be obtained from commercial sources (such as Sigma-Aldrich and Alfa Aesar) or prepared using known synthetic methods and starting materials.

The useful amount of all $D_1$ diols present in the diol mixture used to provide the non-crosslinked, crosslinkable polyurethanes is such that the acid number of the resulting polyurethane, prior to neutralization is at least 20 and up to and including 40, or at least can be at least 25 and up to and including 35. Thus, the critical reason for using one or more $D_1$ diols is to provide the desired acid number. Since the acid number is essentially moles per unit mass, a useful amount of one or more $D_1$ diols can be readily determined by a skilled worker for a specific polyurethane. However, in many embodiments, the amount of the $D_1$ diols used can be at least 25 mol % and up to and including 40 mol %, based on the total of the $D_1$ through $D_4$ diols. Moreover, a skilled worker in the art would know how to adjust the amount of one or more $D_3$ diols with all other diols in the dial mixture to achieve the desired properties of the resulting non-crosslinked, crosslinkable polyurethane using routine experimentation and the teaching provided herein. Without the desired carboxy groups in the $D_1$ diols, the resulting polyurethane would not be water-dispersible and would lack utility in aqueous inkjet ink compositions according to the present invention. As shown in Comparative Examples 1 through 6 shown below, when the polyurethane acid number was below 20, the aqueous inkjet ink composition was turbid and exhibited diminished color fastness (for example, Inks Y2, C2, and M2 shown below). When the polyurethane acid number was above 40, the resulting aqueous inkjet ink composition lacked sufficient color fastness (for example, Inks Y3, C3, and M3).

Each useful $D_2$ diol comprises a chain of one or more repeating $C_2$ to $C_6$ alkylene oxide groups, or particularly one or more repeating $C_3$ or $C_4$ groups, and has a weight average molecular weight of at least 250 and up to and including 3,000, or more likely of at least 250 and up to and including 1,000. Such an alkylene oxide chain can comprise the repeating units of the same alkylene oxide group, or it can comprise repeating units of two or more different alkylene oxide groups, in any order. Each alkylene oxide group can be substituted with one or more substituents that do not interfere with the reaction of the $D_2$ diol with the diisocyanate. For example, useful $D_2$ diols can be represented by the following Structure ($D_2$):

$$HO-(R^1-O)_p-H \quad (D_2)$$

wherein $R^1$ represents the same or different alkylene group in each of the "p" alkylene oxide repeating units, and p can be an integer of at least 4 and can be as high as necessary for a given $R^1$ group to achieve the desired $D_2$ diol molecular weight. In most embodiments, $R^1$ is the same alkylene oxide group for all repeating alkylene oxide repeating units.

Useful the $D_2$ diols include but are not limited to, ethylene oxide, n-propylene oxide, tetramethylene oxide, neopentyl oxide, hexane oxide, a poly(tetramethylene glycol) such as Terathane® 650 polyether glycol (average $M_n$ of 650), and can be obtained from commercial sources or prepared using known synthetic methods and starting materials.

The useful amount of the $D_2$ diols present in the mixture of diols used to provide the non-crosslinked, crosslinkable polyurethanes can be at least 30 mol % and up to and including 75 mol %, or at least 40 mol % and up to and including 65 mol %, based on the total moles of diols in the diol mixture and especially in view of the total of the $D_1$ through $D_4$ diols in the diol mixture. A skilled worker in the art would know how to adjust the amount of one or more $D_2$ diols with the other diols in the diol mixture to achieve the desired non-crosslinked, crosslinkable polyurethane properties using routine experimentation and the teaching provided herein. The presence of the $D_2$ diol provides desired flexibility in the resulting inkjet printed images, especially on textiles. Without the presence of the $D_2$, the polyurethane $T_g$ can be too high and the inkjet printed image would be too brittle and would be susceptible to cracking or flaking off a textile substrate and such images would also have an uncomfortable feel.

In some embodiments, non-crosslinked, crosslinkable polyurethanes are prepared using one or more $D_3$ diols in the diol mixture that are also reacted with the one or more aromatic diisocyanates described above. Each useful $D_3$ diol is either (i) an aliphatic cyclic diol, or (ii) an alkoxylated bisphenol A, or mixtures of both (i) and (ii).

Useful (i) aliphatic cyclic diols generally comprise a saturated substituted or unsubstituted cyclopentyl, cyclohexyl, or fused ring diol wherein any substituents on the saturated cyclic ring besides the hydroxy groups do not participate in or interfere with the condensation reaction with the aromatic diisocyanate described above.

For the (ii) diols, the hydroxy substituents on each phenyl ring of Bisphenol A have been replaced with the same or different polyalkylene oxide group terminated with a hydroxy group, as represented by $-O-(R^2-O)_q-H$ wherein $R^2$ is a linear or branched alkylene group having 2 to 4 carbon atoms and q is an integer of 1 to 5. The most common alkoxylated Bisphenol A is an ethoxylated Bisphenol A in which each polyalkylene group is a chain of one or more ethyleneoxide units, such as Bisphenol A bis(2-hydroxypropyl) ether.

Useful $D_3$ diols can be obtained from commercial sources such as Arkema and Kowa or they can be prepared using known synthetic methods and starting materials.

The one or more $D_3$ diols can be present in the diol mixture in an amount of at least 5 mol % and up to and including 30 mol %, or more likely of at least 8 mol % and up to and including 25 mol %, all based on the total amount of all diols in the diol mixture and especially based on the total of all $D_1$ through $D_4$ diols in the diol mixture. A skilled worker would be able to use the teaching provided herein to adjust the amount of the $D_3$ diol to achieve the desired polyurethane properties.

In many embodiments, one or more $D_4$ diols can also be present in the diol mixture with all the other diols described above, and they are particularly present when one or more $D_3$ diols are included in the diol mixture. Each $D_4$ diol can have a weight average molecular weight ($M_w$) that at least 1,000 and up to and including 7,000 and is a hydroxy-terminated polybutadiene. This means that the $D_4$ diol has hydroxy groups on both ends of an ethylenically unsaturated, linear or branched, alkenylene group. The unsaturated C=C double bond can be located in any part of the molecule, and the $D_4$ diol can be a cis molecule, trans molecule, or a mixture of both cis and trans molecules. In addition, the $D_4$ diol can have a pendant allyl group along the molecular chain, and such pendant allyl group-containing molecules can be present in a mixture with cis, trans, or both cis and trans molecules.

Representative useful $D_4$ diols include but are not limited to, KRASOL, POLYBD, and polybutadiene, hydroxyl terminated having an average $M_w$ of 2400. Thus, useful $D_4$ diols can be obtained from commercial sources such as Total Cray Valley under the tradename KRASOL or POLYBD.

The one or more $D_4$ diols can be present in the diol mixture if an amount of at least 0.1 mol % and up to and including 5 mol %, more likely of at least 0.2 mol % and up to and including 2 mol %, or at least 0.3 mol % and up to and including 1.5 mol %, all based on the total amount of dials in the diol mixture and especially based on the total amount of $D_1$ through $D_4$ diols in the diol mixture. A skilled worker would be able to use the teaching provided herein to adjust the amount of the $D_4$ diol to achieve the desired non-crosslinked, crosslinkable polyurethane properties.

Preparation of useful non-crosslinked, crosslinkable polyurethanes according to the present invention can be achieved using known preparatory methods using the reactants described above. Representative syntheses are provided below in the working Examples.

A particularly useful non-crosslinked, crosslinkable polyurethane has an acid number of at least 25 and up to and including 35 and a glass transition temperature ($T_g$) of at least 10° C. up to and including 40° C., and can be prepared by reaction of 4,4-methylenebis(phenyl isocyanate), 2,2-bis (hydroxymethyl) propionic acid (or neutralized form) as the $D_1$ diol, Terathane® 650 polyether glycol (average $M_n$ of 650) as the $D_2$ diol, bisphenol A bis (2-hydroxypropyl) ether as the $D_3$ diol, and poly(butadiene), hydroxyl terminated, as the $D_4$ dial.

Aqueous Inkjet Ink Compositions (Inks)

Jet velocity, separation length of the droplets, drop size, and stream stability are affected by the surface tension and viscosity of an aqueous inkjet ink composition. Generally, each the aqueous inkjet ink composition according to the present invention has a surface tension of at least 20 dyne/cm and up to and including 70 dyne/cm at 25° C., as measured using a standard tensiometer and the plate method. The aqueous inkjet ink composition generally has physical properties compatible with a wide range of ejecting conditions, such as driving frequency of the pen, shape, and size of the inkjet nozzle.

One or more non-crosslinked, crosslinkable polyurethanes according to the present invention are incorporated into an aqueous inkjet ink composition with the other components (described below). All of the components are formulated in an aqueous medium (predominantly water as defined below) to provide a viscosity of at least 1 centipoise (or 0.001 N-sec) and up to and including 100 centipose (or 0.1 N-sec), or at least 1 (or 0.001 N-sec) and up to and including 30 centipoise (or 0.03 N-sec), all measured at 25° C. using a standard viscometer. Representative aqueous inkjet ink compositions and methods for making them are described below in the working examples.

For example, a useful amount of one or more non-crosslinked, crosslinkable polyurethanes in the aqueous inkjet ink composition can be at least 1 weight % and up to and including 20 weight %, or at least 2 weight % and up to and including 15 weight %, based on the total wet weight of the aqueous inkjet ink composition (including water).

The pH of the aqueous inkjet ink compositions according to the present invention can be adjusted if desired to at least 4 and up to and including 10, or more likely of at least 6 and up to and including 9. The pH can be achieved using any suitable base such as a hydroxide or an organic amine in a suitable amount. Buffers can be included to maintain the desired pH as would be apparent to one skilled in the art, according to Cols. 17-19 of U.S. Pat. No. 8,455,570 (Lindstrom et al.), the disclosure of which is incorporated herein by reference.

An aqueous solvent medium (or "aqueous vehicle") is generally present in the aqueous inkjet ink compositions in an amount of at least 75 weight % or at least 80 weight %, and generally at no more than 90 weight %, based on the total aqueous inkjet ink composition weight. The aqueous solvent medium generally comprises at least 50 weight %, or even at least 80 weight %, water, based on the total weight of all solvents in the aqueous inkjet ink composition. Water-miscible solvents can be present if desired, some of which may be considered humectants or organic co-solvents as described below. But, in most embodiments, at least 90 weight % of the solvent medium is water. Selection of a suitable aqueous solvent medium depends upon requirements of a specific printing application such as desired surface tension and viscosity, the type of substrate to be printed (for example, certain textiles), selected pigment colorant, and desired ink drying time.

The aqueous inkjet ink compositions according to the present invention generally comprise one or more humectants (some of which may also be what are known in the art as co-solvents) that are generally water-soluble or water-miscible organic solvents having a viscosity that is greater than 40 centipoise (0.04 N-sec) or even at least 100 centipoise (0.1 N-sec) when measured at 25° C. using a standard viscometer. For example, any water-soluble humectant known in the inkjet art that is compatible with the other requirements of the present invention can be used. While an individual humectant can be employed, mixtures of two or more humectants, each of which imparts the same or different property, can be used. Representative humectants useful in the aqueous inkjet ink compositions include but are not limited to the following compounds:

(1) mono-alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol;

(2) polyhydric alcohols (or polyols), such as ethylene glycol, diethylene glycol, triethylene glycol, tetraethylene glycol, propylene glycol, dipropylene glycol, the polyethylene glycols with average molecular weights of at least 200 and up to and including 5000 Daltons, the polypropylene glycols with average molecular weights of at least 200 and up to and including 5000 Daltons, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-heptanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol;

(3) polyoxygenated polyols and their derivatives such as glycerol, diglycerol, polyglycerols, glycerol ethoxides, glycerol propoxides, glyceryths, alkylated and acetylated glyceryths, pentaerythritol, pentaerythritol ethoxides, and pentaerythritol propoxides and their alkylated and acetylated derivatives;

(4) nitrogen-containing compounds such as urea, 2-pyrrolidone, N-methyl-2-pyrrolidone, imidazolidinone, N-hydroxyethyl acetamide, N-hydroxyethyl-2-pyrrolidinone, 1-(hydroxyethyl)-1,3-imidazolidinone, 1,3-dimethyl-2-imidazolidinone, and 1,3-dihydroxy-2-imidazolidinone;

(5) sulfur-containing compounds such as 2,2'-thiodiethanol, dimethyl sulfoxide and tetramethylene sulfone; and (6) water soluble N-oxides such as 4-methylmorpholine-N-oxides.

Useful humectants (and organic co-solvents) generally have melting points below the typical operating temperature of the intended printer system to avoid the formation of crystalline deposits on the printhead or in the maintenance system. Practically, this means that the useful humectants have melting points below 30° C. or even below 20° C.

The one or more humectants or co-solvents can be present in an amount of at least 0.5 weight %, or at least 1 weight % and up to and including 35 weight %, all based on the total wet weight of the aqueous inkjet ink composition.

The aqueous inkjet ink compositions according to the present invention include one or more dispersed pigment colorants to provide a desired hue or "color" in an inkjet ink printed image, such as green, black, white, orange, red, violet, blue, yellow, pink, or any other color that can be formulated in this art. Metallic particles can be present a dispersed pigment colorants to provide a metallic effect, alone or in combination with organic pigment colorants.

A wide variety of organic and inorganic pigment colorants can be used individually or in combination. Useful pigment colorants are described for example in U.S. Pat. Nos. 5,026,427 (Mitchell et al.), 5,141,556 (Matrick), 5,160,370 (Suga et al.), and U.S. Pat. No. 5,169,436 (Matrick), the disclosures of all of which are incorporated herein by reference. In most embodiments, the pigment colorants are organic in nature.

Representative pigment colorants include but are not limited to, azo pigments, monoazo pigments, disazo pigments, azo pigment lakes, β-naphthol pigments, naphthol AS pigments, benzimidazolone pigments, disazo condensation pigments, metal complex pigments, isoindolinone and isoindoline pigments, quinacridone pigments, polycyclic pigments, phthalocyanine pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium dioxide, iron oxide, and carbon blacks. Specific pigment colorants are described in Col. 10 (line 51) to Col. 11 (line 40) of U.S. Pat. No. 8,455,570 (Lindstrom et al.), the disclosure of which is incorporated herein by reference.

The useful pigment colorants are generally dispersed in the aqueous inkjet ink compositions. They can be provided in a dispersion that is prepared using known technology, but it is desirable that the dispersed pigment colorant be stabilized using one or more anionic surfactants including but not limited to, those described in U.S. Pat. Nos. 5,662,279 (Czekai et al.); 5,679,138 (Bishop et al.), 5,985,017 (Bogner et al.), and U.S. Pat. No. 6,350,028 (Martin), the disclosures of all of which are incorporated herein by reference. Such stabilizing surfactants generally have a molecular weight of less than or equal to 500 or at least 200 and up to and including 500.

Useful pigment colorants can have a median particle diameter of less than 200 nm and more likely less than 180 nm. As useful herein, the term "median particle diameter" refers to the $50^{th}$ percentile of the intensity mode particle size distribution such that 50% of the particles are provided by particles having diameters smaller than the indicated diameter. A laser light scattering device can be used to measure the particle size distributions.

One or more dispersed pigment colorants can be present in each aqueous inkjet ink composition in an amount of at least 0.1 weight % and up to and including 30 weight %, or more likely of at least 1 weight % and up to and including 10 weight %, based on the total weight of the aqueous inkjet ink composition.

It can be desirable in some embodiments for the aqueous inkjet ink composition to comprise one or more crosslinking agents that facilitate crosslinking of the non-crosslinked, crosslinkable polyurethane as described above, especially after an inkjet printed image has been formed. This curing can be facilitated by heating as described below. Useful crosslinking agents would be readily apparent to one skilled in the art, and include for example, one or more amide and amine-formaldehyde resins (such as a melamine-formaldehyde resin), phenolic resins, urea resins, carbodiimides, and glyoxals.

Such a crosslinking agent can be present in an amount of at least 0.1 weight % and up to and including 5 weight %, or at least 0.3 weight % and up to and including 3 weight %, based on the total weight of the aqueous inkjet ink composition.

The aqueous inkjet ink compositions according to this invention can include various optional addenda that are commonly used in such compositions for a variety of properties. Such optional addenda can include anionic acrylic polymers and anionic styrene-acrylic polymers that are water-soluble or water-dispersible due to the presence of anionic groups distributed throughout the polymeric backbone. Such water-solubilizing anionic groups can include sulfonic acids and carboxylic acids. For these polymers, the term "water-soluble" is meant herein that when the anionic acrylic polymer or anionic styrene-acrylic polymer is dissolved in water and when such polymer is at least partially neutralized with an inorganic monovalent base or an organic amine base, the resultant solution is visually clear. The anionic acrylic polymers and styrene-acrylic polymers can have a weight average molecular weight ($M_w$) of at least 1,000 Daltons up to and including 100,000 Daltons or typically of at least 1,000 Daltons and up to and including 50,000 Daltons. Further details about such polymers and useful amounts are described in U.S. Pat. No. 9,605,169 (Lussier et al.), the disclosure of which is incorporated herein by reference. Representative anionic acrylic polymers and anionic styrene-acrylic polymers are also described for example in [0061] of U.S. Patent Application Publication 2008/207811 (Brust et al.). Examples of useful anionic styrene-acrylic polymers include those commercially available under the trademarks JONCRYL® (S.C. Johnson Co.), TRUDOT® (Mead Westvaco Co.), and VANCRYL® (Air Products and Chemicals, Co.). In such polymers, the term "styrene" includes substituted or unsubstituted ethylenically unsaturated polymerizable styrene molecules as well as benzyl methacrylate and benzyl acrylates.

In addition, modified polysiloxanes can be present in the aqueous inkjet ink compositions. Examples of such materials are ethoxylated or propoxylated silicone-based "surfactants" that can be obtained commercially under the trademarks SILWET® (CL Witco), and BYK® (Byk Chemie) such as BYK® 348 and 381, as well as Dow Corning DC67, DC57, DC28, DC500W, and DC51. Non-silicone surfactants can also be used, including but not limited to anionic, cationic, nonionic, or amphoteric surfactants such as those commercially available as SURFYNOL® surfactants (Air Products) including SURFYNOL® 440 and 465 alkynediol surfactants.

Other optional additives that can be present in the aqueous inkjet ink compositions, in amounts that would be readily apparent to one skilled in the art, include but are not limited to, thickeners, conductivity-enhancing agents, drying agents, waterfast agents, sequestering agents, viscosity modifiers, pH buffers, antifoamants, wetting agents, corrosion inhibitors, biocides, fungicides, defoamers (such as SURFYNOL® DF110L, PC, MD-20, and DF-70), UV radiation absorbers, antioxidants, and light stabilizers available under the trademarks TINUVIN® (Ciba) and IRGANOX® (Ciba), as well as other additives described in Col. 17 (lines 11-36) of U.S. Pat. No. 8,455,570 (Lindstrom et al.).

Ink Sets

The various aqueous inkjet ink compositions according to the present invention can be provided as part of an ink set. Such ink sets can include two or more aqueous color inkjet ink compositions, each of which comprises at least one visible colorant (described below) to provide a color or hue. Typically, an ink set comprises at least three differently colored inks (such as cyan, magenta, and yellow or "CMY") and more usually at least four differently colored inks (such as cyan, magenta, yellow, and black, or "CMYK"), at least one of which inks is an aqueous inkjet ink composition according to the present invention that comprises a non-crosslinked, crosslinkable polyurethane described above. For example, each ink set can include for example, one or more aqueous inkjet ink compositions according to the present invention that are chosen from an aqueous cyan inkjet ink composition, an aqueous magenta inkjet ink composition, an aqueous yellow inkjet ink composition, and optionally, an aqueous black inkjet ink composition. An ink set can further comprise one or more "gamut-expanding" inks including differently colored aqueous inkjet ink compositions that provide, for example orange, red, green, violet, yellow, pink, or blue colors, or a combination thereof, and thus contain one or more suitable dispersed pigment colorants as described above suitable to provide the desired hue. Aqueous white inkjet ink compositions are also useful in certain situations and can be included in an ink set. Any or all these inks can comprise one or more non-crosslinked, crosslinkable polyurethanes as described above.

Each of the aqueous inkjet ink compositions in an ink set can include various materials that are known to be combined for this purpose, including surfactants, humectants or co-solvents, polymers (include core-shell polymers as described in Col. 13, lines 26-39 of U.S. Pat. No. 8,455,570, noted above), biocides, thickeners, non-colored particles, and other materials that are described above as addenda for the aqueous green inkjet ink compositions.

Each aqueous inkjet ink composition in an ink set can be supplied in an individual cartridge that can be inserted into an appropriate inkjet printing apparatus as would be readily apparent to one skilled in the art.

Inkjet Printing Methods and Systems

The method according to the present invention can be practiced by providing a suitable substrate (described below), and ink jetting an aqueous inkjet ink composition according to the present invention as spaced ink drops to provide a ink jetted color image on the substrate using any suitable ink jetting equipment.

Thus, the ink jetted color image can be provided by inkjet printing one or more aqueous inkjet ink compositions using thermal or piezoelectric drop-on-demand (DOD) printheads or continuous (CIJ) printheads. Each type of printhead and apparatus attached thereto require specific properties in the aqueous inkjet ink compositions to achieve reliable and accurate ink jetting.

For example, some embodiments of the method using a drop-in-demand or continuous inkjet printing apparatus, can comprise:
 providing a suitable substrate having a predetermined area for imaging,
 ink jetting an aqueous inkjet ink composition (according to the present invention) from a main fluid supply as a continuous stream that is broken into both spaced ink drops and non-printing ink drops, and
 collecting and returning (recirculating) the non-printing ink drops to the main fluid supply.

Alternatively, each aqueous inkjet ink composition can be inkjet printed from individual cartridges until they are emptied, which cartridges can be re-filled and re-used using technology available in the art. Typically, cartridges are used in DOD printing systems.

The aqueous inkjet ink compositions according to the present invention can be printed through an ink jet head, for example, that is capable of achieving firing frequencies of at least 12 kHz with a near nozzle velocity of at least 10 meters/second. Any of the known print heads designed in the art of ink jet printing can be used that are capable of achieving the desired high speed firing frequencies. For example, an ink jet printing apparatus can be equipped with a thermal ink jet print head such as those described in U.S. Patent Application Publications 2006/0103691 (Died et al.) and 2008/0136867 (Lebens et al.) as well as in U.S. Pat. No. 8,186,822 (Li et al.), the disclosures of all of which are incorporated herein by reference.

Examples of a suitable inkjet printing systems in which the aqueous inkjet ink composition according to the present invention can be used are shown in U.S. Pat. No. 8,192,008 (Brust et al.) and U.S. Patent Application Publication 2012/0050380 (Falkner et al.), the disclosures of which are incorporated herein by reference. Various DOD liquid emission devices have been known as ink jet printing devices for many years and are described for example in the noted US '008.

One sub-system common to most CU apparatus and methods and to some of the more recent DOD printing systems, is a recirculating fluid system, which constantly recirculates an aqueous inkjet ink composition, for which the median particle size of the dispersed pigment colorants and the overall stability of the pigment colorant dispersion, are critical features due to the potentially abrasive nature of such materials. Larger dispersed pigment colorant particles or less stable pigment colorant particle dispersions are more prone to cause premature wear or failure of the components of the inkjet printing system and fluid sub-system.

The method according to this invention can be carried out to provide a suitable color inkjet ink image on a suitable substrate (also known in the art as "receiver" or "receiver element"). Any individual substrate will have what would be understood as a total "printable" area onto which one or more aqueous inkjet ink compositions can be ink jetted using suitable equipment and processes. The substrate can be any suitable material including plain paper, treated papers (such as coated papers like photographic papers), textiles, and non-porous substrates such as polymeric films.

Suitable substrates can also include but are not limited to, photoglossy receivers or plain paper receivers such as bright white inkjet papers that are commercially available from commercial sources (as described for example, in Col. 13, lines 28-34) of U.S. Pat. No. 8,187,371 (noted above). The photoglossy receivers (also known as swellable media or microporous media) can be manufactured with a coated layer on an underlying paper support and are also useful for providing photographic quality inkjet printed images. Some details of such substrates are provided in Col. 13 (lines 37-51) of U.S. Pat. No. 8,187,371 (noted above). Plain papers can be treated with multivalent salts during or after manufacture as is well known in the art. Other useful substrates are described in U.S. Pat. Nos. 6,045,917 (Missell et al.), 5,605,750 (Romano et al.), 5,723,211 (Romano et al.), and 5,789,070 (Shaw-Klein et al.).

Useful paper substrates include plain bond papers, surface-treated papers, coated or calendared business gloss papers, resin-coated papers, laminated substrates comprising both paper layers and polymeric film layers such as polyester film layers, and heavy stock papers. It is also possible to use cardboard, plastic films (such as polyester films), microporous materials, and any other substrate material known in the art. Thus, the substrate can be transparent, translucent, or opaque. The substrate can be in the form of a rigid or semi-rigid sheet or a wound roll.

A substrate can be pretreated with a pretreatment composition comprising a water-soluble multivalent metal ion salt, such as but not limited to, a salt comprising one or more multivalent cations including calcium, magnesium, barium, zinc, and aluminum cations, with calcium and magnesium cations being particularly useful. Examples of useful multivalent metal cation salts include but are not limited to, calcium chloride, calcium acetate, calcium nitrate, magnesium chloride, magnesium acetate, magnesium nitrate, barium chloride, barium nitrate, zinc chloride, zinc nitrate, aluminum chloride, aluminum hydroxychloride, and aluminum nitrate. Other useful salts could be determined by a skilled artisan, and one or more of such multivalent metal cation salts can be used in the pretreatment composition in an amount that would be readily apparent to one skilled in the art.

Such pretreatment compositions can also comprise a cationic polyelectrolyte comprising amidine moieties, and the details of such compounds and their useful amounts are provided in U.S. Pat. No. 8,562,126 (Xiang et al.), the disclosure of which is incorporated herein by reference.

It is particularly useful to use the aqueous inkjet ink compositions according to this invention for inkjet printing of textile materials including but not limited to, cotton, wool, silk, nylon, leather, polyester, and other materials known in the art for fabrics, apparel, signage, upholstery fabrics, draperies, carpeting, artwork, and wall paper. For example, fibrous materials can be in the form of sheet-form textile woven fabrics, knitted fabrics, or webs. Such textile materials can be porous or non-porous.

Suitable commercially available inkjet printers designed for textile printing include but are not limited to, DuPont® Artistri® 2020 and 3210 Textile Printers (E.I. du Pont de Nemours and Company), Textile Jet (Mimaki USA, Duluth, Ga.), DisplayMaker Fabrijet (MacDermind ColorSpan, Eden Prairie, Minn.), Ricoh Ri3000 and Ri6000 printers (Ricoh), and other commercial inkjet printers that include Ricoh, Epson, or Mimaki print heads.

The inkjet printed images can be post processed with heat, pressure, or both heat and pressure to facilitate the crosslinking desired for improved image durability, wash fastness, and color fastness. The upper temperature for such operations is dictated by the tolerance of the particular textile being printed and the aqueous inkjet ink composition being used. The lower temperature is determined by the amount of heat needed to achieve the desired level of printed image durability. Generally, the useful temperature for post processing will be at least 100° C., or even at least 125° C.

Post processing pressure can be very modest, for example at least 3 $psi_g$ (0.21 $kg/cm^2$) and up to and including 30 $psi_g$ (2.1 $kg/cm^2$).

The duration of any post processing time with heat or pressure is not particularly critical but can be determined using routine experimentation for a given set of temperature and pressure.

The present invention provides at least the following embodiments and combinations thereof, but other combinations of features are considered to be within the present invention as a skilled artisan would appreciate from the teaching of this disclosure:

1. A method for inkjet printing, comprising:
inkjet printing an aqueous inkjet ink composition onto a substrate to provide an inkjet printed image, wherein the aqueous inkjet ink composition has a viscosity of at least 1 centipoise and up to and including 100 centipoise at 25° C., and comprises:
   (a) an aqueous solvent medium,
   (b) a non-crosslinked, crosslinkable polyurethane having an acid number of at least 20 and up to and including 40, and a glass transition temperature ($T_g$) of up to and including 40° C.,
   the non-crosslinked crosslinkable polyurethane derived from:
   1) an aromatic diisocyanate; and
   2) a diol mixture of at least $D_1$ and $D_2$ diols, and optionally including a $D_3$ diol, a $D_4$ diol, or both the $D_3$ and $D_4$ diols,
   wherein:
      the $D_1$ diol comprises a $C_3$ to $C_7$ aliphatic group between two hydroxy groups, and at least one pendant carboxy group or pendant neutralized carboxy group,
      the $D_2$ diol comprises a chain of one or more repeating $C_2$ to $C_6$ alkylene oxide groups and has a molecular weight of at least 250 and up to and including 3,000,
      the $D_3$ diol comprises an alkoxylated bisphenol A or aliphatic cyclic diol that is present in an amount of at least 5 mol %, based on the total molar amount of the $D_1$ through $D_4$ diols in the diol mixture, and
      the $D_4$ diol is a hydroxy-terminated polybutadiene having a molecular weight of at least 1000, and is present in an amount of at least 0.1 mol % and up to and including 5 mol %, based on the total molar amount of the $D_1$ through $D_4$ diols in the diol mixture;
   (c) a dispersed pigment colorant;
   (d) a humectant or organic co-solvent, and
   (e) optionally, a crosslinking agent.

2. The method of embodiment 1, further comprising treating the inkjet printed image with heat.

3. The method of embodiment 1 or 2, further comprising treating the inkjet printed image with both heat and pressure.

4. The method of any of embodiments 1 to 3, wherein the substrate is a textile material.

5. The method of any of embodiments 1 to 4, comprising providing a black, cyan, yellow, or magenta inkjet printed image using the aqueous inkjet ink composition.

6. The method of any of embodiments 1 to 5, comprising using two or more aqueous inkjet ink compositions, to provide a multi-colored inkjet printed image on the substrate.

7. The method of any of embodiments 1 to 6, wherein the dispersed pigment colorant is dispersed using an anionic surfactant having a molecular weight of less than 500.

8. The method of any of embodiments 1 to 7, wherein the diol mixture further comprises the $D_3$ diol.

9. The method of embodiment 8, wherein the diol mixture further comprises the $D_4$ diol.

10. The method of any of embodiments 1 to 9, wherein the aqueous inkjet ink composition further comprises the crosslinking agent that is that is a melamine formaldehyde resin, carbodiimide, glyoxal, urea resin, or phenolic resin.

11. The method of any of embodiments 1 to 10, wherein the non-crosslinked, crosslinkable polyurethane is present in an amount of at least 2 weight % and up to and including 15 weight %, based on the total wet weight of the inkjet ink composition.

12. The method of any of embodiments 1 to 11, wherein the humectant or organic co-solvent is present in the aqueous inkjet ink composition in an amount of at least 0.5 weight % and up to and including 35 weight %, based on the total weight of the aqueous inkjet ink composition.

13. The method of any of embodiments 1 to 12, wherein the aqueous inkjet ink composition has a viscosity of at least 1 and up to and including 30 centipoise, at 25° C.

14. The method of any of embodiments 1 to 13, wherein the non-crosslinked, crosslinkable polyurethane has an acid number of at least 25 and up to and including 35, a glass transition temperature ($T_g$) of at least 10° C. and including 40° C., and a weight average molecular weight of at least 20,000 and up to and including 150,000.

15. The method of any of embodiments 1 to 14, wherein the $D_1$ diol comprises a repeating $C_3$ to $C_5$ aliphatic group between the two hydroxy groups.

16. The method of any of embodiments 1 to 15, wherein the $D_2$ diol comprises a chain of repeating $C_3$ or $C_4$ alkylene oxide groups and has a molecular weight of at least 250 and up to and including 1,000.

17. The method of any of embodiments 8 to 16, wherein the $D_3$ dial comprises an alkoxylated bisphenol A.

18. The method of any of embodiments 8 to 17, wherein the $D_3$ diol is present in an amount of at least 5 mol % and up to and including 30 mol %, based on the total molar amount of the $D_1$ through $D_4$ dials in the diol mixture.

19. The method of any of embodiments 8 to 18, wherein the $D_3$ dial is present in an amount of at least 8 mol % and up to and including 25 mol %, based on the total molar amount of the $D_1$ through $D_4$ diols in the diol mixture.

20. The method of any of embodiments 9 to 19, wherein the $D_4$ diol has a molecular weight of at least 1,000 and up to and including 7,000.

21. The method of any of embodiments 9 to 20, wherein the $D_4$ diol is present in an amount of at least 0.2 mol % and up to and including 2 mol %, based on the total molar amount of the $D_1$ through $D_4$ diols in the diol mixture, The following Examples are provided to illustrate the practice of this invention and are not meant to be limiting in any manner.

The polyurethanes (PU-1 through PU-8 and PU-10 through PU-15) used in the examples were prepared using the following synthetic method described for PU-1 with variations shown in the following TABLE I. PU-9 was prepared as Crosslinked Polyurethane Dispersion of U.S. Pat. No. 8,186,822 (noted above).

To a round bottom flask equipped with a stirrer and water condenser place, 1.68 g (0.0125 moles) of 2,2-bis(hydroxymethyl) propionic acid ($D_1$ diol), 10.72 g (0.016485 moles) of Terathane® 650 polyether glycol having an average Mn of 650 ($D_2$ diol), 2.77 g (0.00805 moles) of Bisphenol A bis(2-hydroxypropyl) ether ($D_3$ diol), 0.28 g, (0.000115 moles) polybutadiene, hydroxyl terminated having an average Mw of 2400 ($D_4$ diol), 25 g of tetrahydrofuran (THF), and 0.06 g of dibutyl tin dilaurate were added to form a diol mixture. The temperature of the diol mixture was adjusted to 65° C., and when a homogeneity was observed, 9.30 g (0.03715 moles) of 4,4'-methylenebis(phenyl isocyanate) was added to form a reaction solution of five components. The reaction solution was raised to 73° C. and maintained until the condensation reaction of diisocyanate and the four diols to form a polyurethane was complete. The reaction solution was then cooled to room temperature before the polyurethane was neutralized by addition of a mixture of 0.72 g of 29 weight % ammonium hydroxide and 10 g of distilled water to achieve 100% stoichiometric ionization based on the amount of $D_1$ that had been added. An additional 65 g of distilled water was then added and the THF was subsequently removed by heating under vacuum. The resultant aqueous dispersion was filtered, resulting in a polyurethane (PU-1) concentration of about 20 weight %. The aqueous dispersion pH was 7.6. The polyurethane was isolated and determined to have a Mw of 52,300, a Mn of 17,100, an acid number (AN) of 28, and a Tg of 29° C.

The following materials were used in making the various polyurethanes:

2,2-bis(hydroxymethyl) propionic acid (BHPA);
Terathane® 650 polyether glycol having an average Mn of 650 (TPEG);
Bisphenol A bis(2-hydroxypropyl) ether (BPA, DIANOL 320 from Arkema Corporation);
polybutadiene, hydroxyl terminated (average $M_w$ of 2400, PolyBD, Sigma-Aldrich), or polybutadiene, hydroxyl terminated (average $M_w$ of 6200, Sigma-Aldrich);
4,4'-methylenebis(phenyl isocyanate) (MDI);
Isophorone diisocyanate (IPDI);
1,12-dodecanediol (DDEC);
1,4-Cyclohexane dimethanol, mixture of cis and trans isomers (CHDM, Sigma-Aldrich); and
Bisphenol A diethanol (BA-2 Glycol, Kowa).

TABLE I

| PU | Diisocyanate | $D_1$ | $D_1$ mol % | $D_2$ | $D_2$ mol % | $D_3$ | $D_3$ mol % | $D_4$ | $D_4$ mol % |
|---|---|---|---|---|---|---|---|---|---|
| 1 | MDI | BHPA | 33.65 | TPEG | 44.37 | BPA | 21.67 | PolyBD | 0.31 |
| 2 | MDI | BHPA | 13.73 | TPEG | 61.7 | BPA | 24.22 | PolyBD | 0.35 |
| 3 | MDI | BHPA | 53.37 | TPEG | 36.12 | BPA | 10.24 | PolyBD | 0.27 |
| 4 | MDI | BHPA | 32.3 | TPEG | 44.81 | CHDM | 22.61 | PolyBD | 0.28 |
| 5 | MDI | BHPA | 33.65 | TPEG | 41.24 | BPA | 21.67 | DDEC | 3.44 |
| 6 | IPDI | BHPA | 33.65 | TPEG | 44.37 | BPA | 21.67 | PolyBD | 0.31 |
| 7 | MDI | BHPA | 33.65 | TPEG | 60.66 | BPA | 5.38 | Poly BD | 0.31 |
| 8 | MDI | BHPA | 33.65 | TPEG | 42.66 | BPA | 21.67 | PolyBD | 2.02 |
| 9 | IPDI | | | | | | | | |
| 10 | MDI | BHPA | 33.65 | TPEG | 34.68 | BPA | 21.67 | PolyBD | 10 |
| 11 | MDI | BHPA | 33.65 | TPEG | 39.68 | BPA | 21.67 | PolyBD | 5 |
| 12 | MDI | BHPA | 33.65 | TPEG | 63.04 | BPA | 3 | PolyBD | 0.31 |
| 13 | MDI | BHPA | 33.65 | TPEG | 65.04 | BPA | 1 | PolyBD | 0.31 |
| 14 | MDI | BHPA | 37.6 | TPEG | 62.4 | BPA | 0 | PolyBD | 0 |
| 15 | MDI | BHPA | 35.11 | TPEG | 53.87 | BPA | 11.02 | PolyBD | 0 |

TABLE I-continued

| PU | Acid number | $M_w$ | $M_n$ | $T_g$ |
|---|---|---|---|---|
| 1 | 28 | 60,400 | 17,100 | 32° C. |
| 2 | 10 | 54,500 | 11,300 | 0.6° C. |
| 3 | 50 | 59,100 | 16,000 | 46.0° C. |
| 4 | 29 | 38,000 | 12,300 | 21.1° C. |
| 5 | 29 | 41,400 | 14,600 | 27.9° C. |
| 6 | 30 | 27,500 | 5,950 | 14.2° C. |
| 7 | 26 | 77,700 | 16,300 | 0.5° C. |
| 8 | 27 | 68,000 | 10,800 | 23.7° C. |
| 9 | 20 | 67,200 | 6,010 | −42° C. |
| 10 | 23 | 237,000 | 7,240 | 12.3° C. |
| 11 | 25 | 125,000 | 8,660 | 21.7° C. |
| 12 | 26 | 52,600 | 11,700 | −4.7° C. |
| 13 | 26 | 52,800 | 13,100 | −7.1° C. |
| 14 | 30 | 96,200 | 26,000 | 1.5° C. |
| 15 | 29 | 85,900 | 23,300 | 14.7° C. |

NU means "not used"
UNK means "unknown"
PU 9 was a replication of a polyurethane described in U.S. Pat. No. 8,186,822.

For the aqueous inkjet ink compositions described and evaluated below, stock yellow, cyan, and magenta inkjet ink compositions ("inks") were prepared with the components shown below in TABLE II. The yellow pigment colorant in the aqueous yellow inkjet ink composition was dispersed (stabilized) using polymer available as Eastman Kodak catalog number 1760081, while the cyan and magenta pigment colorants in the other aqueous inkjet ink compositions were dispersed (stabilized) with Specialty Aqueous Dispersant 1 containing an anionic surfactant, Eastman Kodak catalog number 1012152.

TABLE II

|  | Cyan Inks C1-C15 (grams) | Yellow Inks Y1-Y15 (grams) | Magenta Inks M1-M15 (grams) | Self-Dispersed Black Inks SDK1 and SDK15 (grams) |
|---|---|---|---|---|
| Biocide (9.5% solution) | 0.1 | 0.1 | 0.1 | 0.1 |
| Acetylenic nonionic surfactant (10% solution) | 7.3 | 7.3 | 7.3 | 7.3 |
| Humectant | 12.1 | 12.1 | 12.1 | 12.1 |
| Humectant | 4.0 | 4.0 | 4.0 | 4.0 |
| Alkanediol surfactant | 0.8 | 0.8 | 0.8 | 0.8 |
| Buffer (20% solution) | 0.1 | 0.1 | 0.1 | 0.1 |
| Polymer jetting aid | 3.2 | 3.2 | 3.2 | 3.2 |
| Cyan dispersion (12.5% solids) stabilized with anionic surfactant dispersant | 13.5 | 0 | 0 | 0 |
| Magenta dispersion (12.5% solids) stabilized with anionic surfactant dispersant | 0 | 0 | 28.5 | 0 |
| Yellow dispersion (16.5% solids) stabilized with polymeric dispersant | 0 | 20.2 | 0 | 0 |
| Black self-dispersed dispersion (13% solids) | 0 | 0 | 0 | 25.8 |

TABLE II-continued

|  | Cyan Inks C1-C15 (grams) | Yellow Inks Y1-Y15 (grams) | Magenta Inks M1-M15 (grams) | Self-Dispersed Black Inks SDK1 and SDK15 (grams) |
|---|---|---|---|---|
| Aerotex® 3730 crosslinking agent | 0.7 | 0.7 | 0.7 | 0.7 |
| Polyurethane (PU per TABLE III below) | 5.9 | 5.9 | 5.9 | 5.9 |
| Water | 52.3 | 45.6 | 37.3 | 40 |
| Total | 100.0 | 100.0 | 100.0 | 100.0 |

Evaluations of Aqueous Inkjet Ink Compositions:

Each aqueous inkjet ink composition was evaluated for color fastness by depositing ("printing") 5 drops on a 1 inch (2.54 cm) square piece of a white cotton fabric obtained from a Dickies® Heavyweight Crew Tee shirt purchased in a local store, to form a printed color image on the textile. Each printed color image was cured at 350° F. (177° C.) for 60 seconds and allowed to cool to room temperature for at least 30 minutes. Each printed color image was then immersed in a 1 weight % solution of Alconox® R detergent and allowed to soak overnight.

Each printed color image was then evaluated independently for colorfastness on the textile by two different individuals on a scale of 1 to 5 where a value of "5" indicated no evidence of discoloration (or no loss of ink) while a value of "1" indicated complete discoloration of (or complete loss of ink from) the printed color image in to the detergent solution. The following TABLE II shows the average of the two independent evaluations for each tested aqueous inkjet ink composition and comments related thereto.

TABLE III

| Polyurethane | Inkjet Ink Composition | Inkjet Ink Color | Acid Number | Colorfast Evaluation Average | Comments |
|---|---|---|---|---|---|
| PU-1 | Y1 | Yellow | 28 | 4 | Novel polyurethane; excellent color fastness |

TABLE III-continued

| Polyurethane | Inkjet Ink Composition | Inkjet Ink Color | Acid Number | Colorfast Evaluation Average | Comments |
|---|---|---|---|---|---|
| PU-1 | C1 | Cyan | 28 | 5 | Novel polyurethane; excellent color fastness |
| PU-1 | M1 | Magenta | 28 | 5 | Novel polyurethane; excellent color fastness |
| PU-1 | SDK-1 | Black | 28 | 4 | Novel polyurethane; excellent color fastness |
| PU-2 | Y2 | Yellow | 10 | 2.5 | Turbid in solution, like a latex |
| PU-2 | C2 | Cyan | 10 | 4 | Turbid in solution, like a latex |
| PU-2 | M2 | Magenta | 10 | 4.5 | Turbid in solution, like a latex |
| PU-3 | Y3 | Yellow | 50 | 2 | Very poor colorfastness |
| PU-3 | C3 | Cyan | 50 | 2 | Very poor colorfastness |
| PU-3 | M3 | Magenta | 50 | 2 | Very poor colorfastness |
| PU-4 | Y4 | Yellow | 29 | 4 | Novel polyurethane; good colorfastness |
| PU-4 | C4 | Cyan | 29 | 4 | Novel polyurethane; good colorfastness |
| PU-4 | M4 | Magenta | 29 | 5 | Novel polyurethane; excellent colorfastness |
| PU-5 | Y5 | Yellow | 29 | 3.5 | |
| PU-5 | C5 | Cyan | 29 | 5 | |
| PU-5 | M5 | Magenta | 29 | 5 | |
| PU-6 | Y6 | Yellow | 30 | 1 | Non-aromatic polyisocyanate; poor colorfastness |
| PU-6 | C6 | Cyan | 30 | 1 | Non-aromatic polyisocyanate; poor colorfastness |
| PU-6 | M6 | Magenta | 30 | 1 | Non-aromatic polyisocyanate; poor colorfastness |
| PU-7 | Y7 | Yellow | 26 | 4 | Novel polyurethane; good colorfastness |
| PU-7 | C7 | Cyan | 26 | 5 | Novel polyurethane; excellent colorfastness |
| PU-7 | M7 | Magenta | 26 | 5 | Novel polyurethane; excellent colorfastness |
| PU-8 | Y8 | Yellow | 27 | 3 | Novel polyurethane; fair colorfastness |
| PU-8 | C8 | Cyan | 27 | 4.5 | Novel polyurethane; good colorfastness |
| PU-8 | M8 | Magenta | 27 | 5 | Novel polyurethane; excellent colorfastness |
| PU-9 | Y9 | Yellow | 20 | 2 | Poor colorfastness; PU replicated from U.S. Pat. No. 8,186,822 PU dispersion 1 |
| PU-9 | C9 | Cyan | 20 | 1 | Poor colorfastness; PU replicated from U.S. Pat. No. 8,186,822 PU dispersion 1 |
| PU-9 | M9 | Magenta | 20 | 1 | Poor colorfastness; PU replicated from U.S. Pat. No. 8,186,822 PU dispersion 1 |
| PU-10 | Y10 | Yellow | 23 | 3 | Fair colorfastness; some agglomeration* |
| PU-10 | C10 | Cyan | 23 | 5 | Excellent colorfastness; some agglomeration* |
| PU-10 | M10 | Magenta | 23 | 5 | Excellent colorfastness; some agglomeration* |
| PU-11 | Y11 | Yellow | 25 | 4 | Good colorfastness; some agglomeration* |
| PU-11 | C11 | Cyan | 25 | 5 | Excellent colorfastness; agglomeration* |
| PU-11 | M11 | Magenta | 25 | 5 | Excellent colorfastness; some agglomeration* |
| PU-12 | Y12 | Yellow | 26 | 2 | |
| PU-12 | C12 | Cyan | 26 | 3 | |
| PU-12 | M12 | Magenta | 26 | 5 | |
| PU-13 | Y13 | Yellow | 26 | 3 | |
| PU-13 | C13 | Cyan | 26 | 4 | |
| PU-13 | M13 | Magenta | 26 | 5 | |
| PU-14 | Y14 | Yellow | 30 | 3 | Only $D_1$ and $D_2$ diols used |
| PU-14 | C14 | Cyan | 30 | 5 | Only $D_1$ and $D_2$ diols used |
| PU-14 | M14 | Magenta | 30 | 5 | Only $D_1$ and $D_2$ diols used |
| PU-15 | Y15 | Yellow | 29 | 4 | Only $D_1$, $D_2$, and $D_3$ diols used |
| PU-15 | C15 | Cyan | 29 | 5 | Only $D_1$, $D_2$, and $D_3$ diols used |
| PU-15 | M15 | Magenta | 29 | 5 | Only $D_1$, $D_2$, and $D_3$ diols used |
| PU-15 | SDK15 | Black | 29 | 4 | Only $D_1$, $D_2$, and $D_3$ diols used |

*Some undesirable agglomeration apparent at inkjet printer nozzle meniscus

The aqueous inkjet ink compositions evaluated below were prepared using the components shown below in TABLE IV. The PU used for each set of aqueous inkjet ink compositions is shown below in TABLE V.

TABLE IV

| Component | Cyan Inks 16, 17, 18 (grams) | Magenta Inks 16, 17, 18 (grams) | Yellow Inks 16, 17, 18 (grams) | Black Inks 16, 17, 18 (grams) | Cyan Ink 19 (grams) | Magenta Ink 19 (grams) | Magenta Ink 19 (grams) | Black Ink 19 (grams) | Cyan Ink 20 (grams) | Magenta Ink 20 (grams) | Yellow Ink 20 (grams) | Black Ink 20 (grams) |
|---|---|---|---|---|---|---|---|---|---|---|---|---|
| Biocide (9.5% solution) | 0.1 | 0.1 | 0.1 | 0.1 | 0.1 | 0.1 | 0.1 | 0.1 | 0.1 | 0.1 | 0.1 | 0.1 |
| Polyether modified siloxane surfactant | 0.4 | 0.4 | 0.5 | 0.3 | 0.4 | 0.4 | 0.5 | 0.3 | 0.4 | 0.4 | 0.5 | 0.3 |
| Polymer jetting aid | 5 | 5 | 5 | 5 | 5 | 5 | 5 | 5 | 5 | 5 | 5 | 5 |
| Humectant | 7 | 7 | 7 | 7 | 7 | 7 | 7 | 7 | 7 | 7 | 7 | 7 |
| Humectant | 8 | 8 | 8 | 8 | 8 | 8 | 8 | 8 | 8 | 8 | 8 | 8 |
| Cyan dispersion (12.5% solids) stabilized with anionic surfactant | 27.29 | 0 | 0 | 0 | 27.29 | 0 | 0 | 0 | 0 | 0 | 0 | 0 |
| Magenta dispersion (12.5% solids) stabilized with anionic surfactant | 0 | 38.16 | 0 | 0 | 0 | 38.16 | 0 | 0 | 0 | 0 | 0 | 0 |
| Yellow dispersion (12.5% solids) stabilized with anionic surfactant | 0 | 0 | 22.84 | 0 | 0 | 0 | 22.84 | 0 | 0 | 0 | 0 | 0 |
| Black dispersion (12% solids) stabilized with anionic surfactant | 0 | 0 | 0 | 32.06 | 0 | 0 | 0 | 32.06 | 0 | 0 | 0 | 0 |
| Cyan dispersion (16.5% solids) with polymeric dispersant | 0 | 0 | 0 | 0 | 0 | 0 | 0 | 0 | 19.45 | 0 | 0 | 0 |
| Magenta dispersion (16.5% solids) with polymeric dispersant | 0 | 0 | 0 | 0 | 0 | 0 | 0 | 0 | 0 | 32.64 | 0 | 0 |
| Yellow dispersion (16.5% solids) with polymeric dispersant | 0 | 0 | 0 | 0 | 0 | 0 | 0 | 0 | 0 | 0 | 16.85 | 0 |
| Black dispersion (16.5% solids) with polymeric dispersant | 0 | 0 | 0 | 0 | 0 | 0 | 0 | 0 | 0 | 0 | 0 | 23.13 |
| Aerotex ® 2730 crosslinking agent | 0.72 | 0.72 | 0.72 | 0.72 | 0.72 | 0.72 | 0.72 | 0.72 | 0.72 | 0.72 | 0.72 | 0.72 |

TABLE IV-continued

| Component | Cyan Inks 16, 17, 18 (grams) | Magenta Inks 16, 17, 18 (grams) | Yellow Inks 16, 17, 18 (grams) | Black Inks 16, 17, 18 (grams) | Cyan Ink 19 (grams) | Magenta Ink 19 (grams) | Magenta Ink 19 (grams) | Black Ink 19 (grams) | Cyan Ink 20 (grams) | Magenta Ink 20 (grams) | Yellow Ink 20 (grams) | Black Ink 20 (grams) |
|---|---|---|---|---|---|---|---|---|---|---|---|---|
| PU (TABLE V) | 5.93 | 5.93 | 5.93 | 5.93 | 0 | 0 | 0 | 0 | 5.93 | 5.93 | 5.93 | 5.93 |
| Water | 45.56 | 34.69 | 49.91 | 40.89 | 51.49 | 40.62 | 55.84 | 46.82 | 53.40 | 40.21 | 55.9 | 49.82 |
| Total | 100 | 100 | 100 | 100 | 100 | 100 | 100 | 100 | 100 | 100 | 100 | 100 |

TABLE V

| Ink Set | Inks in Set | Polyurethane | Colorant Dispersant |
|---|---|---|---|
| 1 (Invention) | Cyan 16, Magenta 16, Yellow 16, & Black 16 | PU-14 | Anionic surfactant |
| 2 (Invention) | Cyan 17, Magenta 17, Yellow 17, & Black 17 | PU-1 | Anionic surfactant |
| 3 (Invention) | Cyan 18, Magenta 18, Yellow 18, & Black 18 | PU-15 | Anionic surfactant |
| 4 (Comparative) | Cyan 19, Magenta 19, Yellow 19, & Black 19 | None | Anionic surfactant |
| 5 (Invention) | Cyan 20, Magenta 20, Yellow 20, & Black 20 | PU-14 | Polymeric |

Ink sets 1-4 shown above in TABLE V were evaluated for colorfastness using "Crock Testing" by inkjet printing each ink set ink in an Epson WF 3520 desktop inkjet printer onto 8.5 inch (21.6 cm)×11 inch (27.9 cm) Jacquard Cotton for Inkjet Printing Sheets, Model JAC9802, to form inkjet printed color images on the textile. In each test, blocks of cyan, magenta, yellow, and black aqueous inkjet inks were printed in this manner and each inkjet printed color image was either left at room temperature ("no cure") for 24 hours, or it was cured ("cure") at 350° F. (177° C.) for 60 seconds; allowed to cool to room temperature; and maintained at room temperature 24 hours.

Each textile sample containing a printed color image was then subjected to crocking (AATCC Test Method 8 Colorfastness to Crocking: Crockmeter Method) using a Manual Crockmeter Model 418 (Taber Industries). The fabric test squares used were Testfabrics, Inc. AATCC Crockmeter Squares. Crocking was carried out with both dry and wet fabric test squares (that is, for both "dry rub" testing and "wet rub" testing). The optical density of each test fabric square was measured after crocking to determine the amount of printed ink transferred to the wet or dry test fabric squares ("crocking cloths") using a GretagMacbeth Sectrolino densitometer. The optical density difference between each test fabric square before and after crocking is shown below in TABLE VI. Thus, the amount of printed color ink transferred to the crocking cloth was evaluated by measuring a change in optical density. It is apparent that the transfer of inkjet printed color ink was much greater when no polyurethane according to the present invention was present in the aqueous inkjet ink composition of Ink Set 4, compared to the aqueous inkjet ink compositions of Ink Sets 1-3.

TABLE VI

| | No cure/ dry rub | Cure/ dry rub | No cure/ wet rub | Cure/ web rub |
|---|---|---|---|---|
| Cyan Ink Transferred to Crocking Cloth (Optical Density Difference) | | | | |
| Ink Set 1 (Invention) | 0.025 | 0.021 | 0.108 | 0.115 |
| Ink Set 2 (Invention) | 0.030 | 0.029 | 0.131 | 0.127 |
| Ink Set (Invention) | 0.020 | 0.018 | 0.124 | 0.118 |
| Ink Set (Comparative) | 0.167 | 0.155 | 0.461 | 0.309 |
| Magenta Ink Transferred to Crocking Cloth (Optical Density Difference) | | | | |
| Ink Set 1 (Invention) | 0.018 | 0.024 | 0.133 | 0.127 |
| Ink Set 2 (Invention) | 0.025 | 0.026 | 0.176 | 0.158 |
| Ink Set 3 (Invention) | 0.017 | 0.015 | 0.163 | 0.148 |
| Ink Set 4 (Comparative) | 0.194 | 0.174 | 0.427 | 0.486 |
| Yellow Ink Transferred to Crocking Cloth (Optical Density Difference) | | | | |
| Ink Set 1 (Invention) | 0.033 | 0.041 | 0.126 | 0.160 |
| Ink Set 2 (Invention) | 0.043 | 0.042 | 0.134 | 0.171 |
| Ink Set 3 (Invention) | 0.043 | 0.028 | 0.160 | 0.151 |
| Ink Set 4 (Comparative) | 0.199 | 0.180 | 0.417 | 0.421 |
| Black Ink Transferred to Crocking Cloth (Optical Density Difference) | | | | |
| Ink Set 1 (Invention) | 0.017 | 0.014 | 0.216 | 0.193 |
| Ink Set 2 (Invention) | 0.030 | 0.011 | 0.361 | 0.215 |
| Ink Set 3 (Invention) | 0.025 | 0.010 | 0.291 | 0.209 |
| Ink Set 4 (Comparative) | 0.252 | 0.291 | 0.541 | 0.353 |

Ink Sets 1-5 shown in TABLE V were evaluated for colorfastness through a "Rub Testing" by printing each aqueous inkjet ink composition with an Epson WF 3520 desktop inkjet printer onto 8.5 inch (21.6 cm)×11 inch (27.9 cm) Jacquard Cotton for Inkjet Printing Sheets, Model JAC9802, to form inkjet printed color images on the textile sample. Rectangular blocks of black, red, green, and blue images were inkjet printed.

After inkjet printing each color image, "dry rub" testing was performed by placing an index finger on the left edge of the solid inkjet printed color rectangle and smudging slowly to the right edge into the section of unprinted ("white") textile sample, while maintaining constant and normal pressure (first stroke). This step was repeated two times in the exact same location so that the 2nd and 3rd strokes were carried out on top of the first stroke.

"Wet rub" testing was carried out by performing the same test as described for the "dry rub" testing after one drop of deionized water had been dispensed from a 1 ml disposable pipette onto the inkjet printed color image followed by waiting 30 seconds before the "wet rub" testing.

For testing under "cured" condition, rectangular color images were inkjet printed as described above, heated to 350° F. (177° C.) for 60 seconds, allowed to cool to room temperature, and either the "dry rub" or "wet rub" testing was carried out.

A GretagMacbeth Sectrolino densitometer was used to measure image optical density values just outside of the right edge of each color image where inkjet printed ink had been transferred onto the unprinted (white) area of the textile sample. TABLE VII below shows the results of difference in optical density (or ink transfer) in these tests.

TABLE VII

|  | No cure/ dry rub | Cure/ dry rub | No cure/ wet rub | Cure/ web rub |
|---|---|---|---|---|
| Black Ink Transferred to White Background (Optical Density Difference) | | | | |
| Ink Set 1 (Invention) | 0.011 | 0.017 | 0.019 | 0.012 |
| Ink Set 2 (Invention) | 0.013 | 0.004 | 0.010 | 0.009 |
| Ink Set 3 (Invention) | 0.000 | 0.007 | 0.011 | 0.014 |
| Ink Set 4 (Comparative) | 0.036 | 0.061 | 0.077 | 0.300 |
| Ink Set 5 (Invention) | 0.011 | 0.013 | 0.012 | 0.024 |
| Red Color Transferred to White Background | | | | |
| Ink Set 1 (Invention) | 0.009 | 0.007 | 0.003 | 0.002 |
| Ink Set 2 (Invention) | 0.007 | 0.000 | 0.004 | 0.003 |
| Ink Set 3 (Invention) | 0.000 | -0.002 | 0.002 | -0.001 |
| Ink Set 4 (Comparative) | 0.028 | 0l025 | 0.046 | 0.085 |
| Ink Set 5 (Invention) | 0.020 | 0.000 | 0.006 | 0.004 |
| Green Color Transferred to White Background | | | | |
| Ink Set 1 (Invention) | 0.005 | 0.003 | 0.003 | 0.003 |
| Ink Set 2 (Invention) | -0.001 | -0.004 | 0.006 | 0.004 |
| Ink Set 3 (Invention) | 0.001 | 0.002 | 0.005 | 0.005 |
| Ink Set 4 (Comparative) | 0.019 | 0.020 | 0.033 | 0.035 |
| Ink Set 5 (Invention) | 0.002 | 0.006 | 0.001 | 0.003 |
| Blue Color Transferred to White Background | | | | |
| Ink Set 1 (Invention) | 0.008 | 0.006 | 0.007 | 0.001 |
| Ink Set 2 (Invention) | 0.001 | 0.005 | 0.007 | 0.016 |
| Ink Set 3 (Invention) | 0.009 | 0.005 | 0.004 | 0.002 |
| Ink Set 4 (Comparative) | 0.017 | 0.021 | 0.071 | 0.066 |
| Ink Set 5 (Invention) | 0.002 | 0.009 | 0.003 | 0.008 |

Dry rub testing was also carried out on color images obtained by inkjet printing the aqueous inkjet inks of Ink Set 5 identified above using the same procedures described above. The aqueous inkjet ink compositions in Ink Set 5 were prepared with pigment colorants that were dispersed using a polymeric dispersant rather than an anionic surfactant as for the aqueous inkjet ink compositions in Ink Sets 1-4. Performance of these aqueous inkjet ink compositions in Ink Set 5 was improved over the that of the aqueous inkjet ink compositions of Ink Set 4 containing no polyurethane but, under some conditions, it was not improved as much over the performance of the aqueous inkjet ink compositions in Ink Set 1 as seen in the optical density difference results in TABLE VII above.

Aqueous inkjet Ink Sets 1-4 shown in TABLE V were evaluated for colorfastness by "Wash Testing" by printing the aqueous inkjet ink compositions in each ink set in an Epson WF 3520 desktop inkjet printer onto 8.5 inch (21.6 cm)×11 inch (27.9 cm) Jacquard Cotton for Inkjet Printing Sheets, Model JAC9802, to form various inkjet printed color images on each textile sample. The inkjet printed color images were cured at 350° F. (177° C.) for 60 seconds and allowed to cool to room temperature for at least 30 minutes. The optical density of each inkjet printed color image was then measured with a GretagMacbeth Sectrolino densitometer.

Each inkjet printed textile sample was then washed by immersion in a 1 weight % solution of Alconox® R detergent and allowed to soak overnight. Each inkjet printed textile sample was then dried and the overnight soaking was repeated. After this treatment, the optical density of each washed inkjet printed color image was re-measured with the GretagMacbeth Sectrolino densitometer to determine the amount of ink lost from the sample and the results are shown below in TABLE VIII.

TABLE VIII

Change in Optical Density of Inkjet Printed Color Image After Washing

| Color Image | Ink Set 1 (Invention) | Ink Set 2 (Invention) | Ink Set 3 (Invention) | Ink Set 4 (Comparative) |
|---|---|---|---|---|
| Blue | -0.069 | -0.036 | -0.049 | -0.128 |
| Green | -0.067 | -0.047 | -0.043 | -0.092 |
| Red | -0.034 | -0.021 | -0.002 | -0.057 |
| Cyan | -0.015 | -0.019 | -0.017 | -0.086 |
| Magenta | -0.015 | -0.003 | -0.008 | -0.016 |
| Yellow | -0.061 | -0.050 | -0.051 | -0.090 |
| Black | -0.065 | -0.023 | -0.051 | -0.070 |

The invention has been described in detail with particular reference to certain preferred embodiments thereof, but it will be understood that variations and modifications can be effected within the spirit and scope of the invention.

The invention claimed is:

1. A method for inkjet printing, comprising:
   inkjet printing an aqueous inkjet ink composition onto a substrate to provide an inkjet printed image, wherein the aqueous inkjet ink composition has a viscosity of at least 1 centipoise and up to and including 100 centipoise at 25° C., and comprises:
   (a) an aqueous solvent medium,
   (b) a non-crosslinked, crosslinkable polyurethane having an acid number of at least 20 and up to and including 40, and a glass transition temperature ($T_g$) of up to and including 40° C.,
   the non-crosslinked crosslinkable polyurethane derived from:
   1) an aromatic diisocyanate; and
   2) a diol mixture of at least $D_1$, $D_2$, and $D_3$ diols, and optionally including a $D_4$ diol,
   wherein:
   the $D_1$ diol comprises a $C_3$ to $C_7$ aliphatic group between two hydroxy groups, and at least one pendant carboxy group or pendant neutralized carboxy group,
   the $D_2$ diol comprises a chain of one or more repeating $C_2$ to $C_6$ alkylene oxide groups and has a weight average molecular weight of at least 250 and up to and including 3,000,
   the $D_3$ diol is an alkoxylated bisphenol A or an aliphatic cyclic diol that is present in an amount of at least 5 mol %, based on the total molar amount of the $D_1$ through $D_4$ diols in the diol mixture, and
   the $D_4$ diol is a hydroxy-terminated polybutadiene having a weight average molecular weight of at least 1000, and when present, is present in an amount of at least 0.1 mol % and up to and including 5 mol %, based on the total molar amount of the $D_1$ through $D_4$ diols in the diol mixture;
   (c) a dispersed pigment colorant;
   (d) a humectant or organic co-solvent, and
   (e) optionally, a crosslinking agent.

2. The method of claim 1, further comprising treating the inkjet printed image with heat.

3. The method of claim 1, further comprising treating the inkjet printed image with both heat and pressure.

4. The method of claim 1, wherein the substrate is a textile material.

5. The method of claim 1, comprising providing a black, cyan, yellow, or magenta inkjet printed image using the aqueous inkjet ink composition.

6. The method of claim 1, comprising using two or more aqueous inkjet ink compositions, to provide a multi-colored inkjet printed image on the substrate.

7. The method of claim 1, wherein the diol mixture further comprises the $D_4$ diol.

8. The method of claim 1, wherein the aqueous inkjet ink composition further comprises the crosslinking agent that is a melamine formaldehyde resin, carbodiimide, glyoxal, urea resin, or phenolic resin.

9. The method of claim 1, wherein the non-crosslinked, crosslinkable polyurethane is present in an amount of at least 2 weight % and up to and including 15 weight %, based on the total wet weight of the inkjet ink composition.

10. The method of claim 1, wherein the humectant or organic co-solvent is present in the aqueous inkjet ink composition in an amount of at least 0.5 weight % and up to and including 35 weight %, based on the total wet weight of the aqueous inkjet ink composition.

11. The method of claim 1, wherein the non-crosslinked, crosslinkable polyurethane has an acid number of at least 25 and up to and including 35, a glass transition temperature ($T_g$) of at least 10° C. and including 40° C., and a weight average molecular weight of at least 20,000 and up to and including 150,000.

12. The method of claim 1, wherein the $D_1$ diol comprises a repeating $C_3$ to $C_5$ aliphatic group between the two hydroxy groups.

13. The method of claim 1, wherein the $D_2$ diol comprises a chain of repeating $C_3$ or $C_4$ alkylene oxide groups and has a weight average molecular weight of at least 250 and up to and including 1,000.

14. The method of claim 1, wherein the $D_3$ diol comprises an alkoxylated bisphenol A.

15. The method of claim 1, wherein the $D_3$ diol is present in an amount of at least 5 mol % and up to and including 30 mol %, based on the total molar amount of the $D_1$ through $D_4$ diols in the diol mixture.

16. The method of claim 1, wherein the $D_3$ diol is present in an amount of at least 8 mol % and up to and including 25 mol %, based on the total molar amount of the $D_1$ through $D_4$ diols in the diol mixture.

17. The method of claim 7, wherein the $D_4$ diol has a weight average molecular weight of at least 1,000 and up to and including 7,000.

18. The method of claim 7, wherein the $D_4$ diol is present in the diol mixture in an amount of at least 0.2 mol % and up to and including 2 mol %, based on the total molar amount of the $D_1$ through $D_4$ diols in the diol mixture.

* * * * *